United States Patent [19]

Sakayama et al.

[11] Patent Number: 5,696,606

[45] Date of Patent: Dec. 9, 1997

[54] FACSIMILE APPARATUS INCLUDING PROVISIONS FOR DETERMINING FILE TRANSFER CAPABILITY

[75] Inventors: Takashi Sakayama; Yoshiaki Tezuka; Yoshihiro Maei, all of Saitama, Japan

[73] Assignee: Fuji Xerox Co., Ltd., Tokyo, Japan

[21] Appl. No.: 393,465

[22] Filed: Feb. 27, 1995

[30] Foreign Application Priority Data

Feb. 28, 1994 [JP] Japan .................... 6-052634

[51] Int. Cl.⁶ .................... H04N 1/00; H04N 1/32
[52] U.S. Cl. .................... 358/468; 358/435; 358/436; 358/434; 358/442; 370/401; 370/428; 370/466; 370/467
[58] Field of Search .................... 358/442, 436, 358/435, 468, 400, 434; 395/500; 370/401, 428, 466, 467

[56] References Cited

U.S. PATENT DOCUMENTS

| | | | |
|---|---|---|---|
| 4,000,371 | 12/1976 | Ogawa | 358/435 |
| 4,956,804 | 9/1990 | Matsumoto | 395/442 |
| 5,228,128 | 7/1993 | Kim | 358/442 |
| 5,343,509 | 8/1994 | Dounies | 358/468 |
| 5,418,624 | 5/1995 | Ahmed | 358/436 |

*Primary Examiner*—Kim Vu
*Assistant Examiner*—Tia M. Harris
*Attorney, Agent, or Firm*—Finnegan, Henderson, Farabow, Garrett & Dunner, L.L.P.

[57] ABSTRACT

The present invention provides a facsimile apparatus which comprises a host computer interface control component for controlling an interface with a host computer connected to an external device, a host computer capability detecting component for receiving capability information from the host computer through the host computer interface control component, a control signal preparing component for generating a protocol control signal based on the capability information detected by the host computer capability detecting component, and a communication control component for transferring a file utilizing the protocol control signal generated by the control signal preparing component.

9 Claims, 9 Drawing Sheets

| PI | d |
|---|---|
| 00: HOST COMPUTER STATE | 00: AVAILABLE  01: BUSY |
| 10: FILE TRANSMISSION CAPABILITY | 00: INCAPABLE  01: CAPABLE |
| 11: B F T CAPABILITY | DITTO |
| 12: D T M CAPABILITY | DITTO |
| 13: E D I CAPABILITY | DITTO |
| 14: B T M CAPABILITY | DITTO |
| 20: CODING CAPABILITY | 00: MH, 01: MR, 02: MMR |
| 21: RECORDING SHEET SIZING CAPABILITY | 00: A4, 01: B4, 02: A3 |
| ID | 01: HOST COMPUTER STATE<br>10: TRANSFER CAPABILITY INDICATION |

FIG. 4(a)

| PI | d |
|---|---|
| 00: FACSIMILE STATE | 00: IDLING  01: CALLED<br>02: TRANSMITTING  03: RECEIVING |
| 10: FILE TRANSFER INDICATION | 00: NOT INDICATED<br>01: INDICATED |
| 11: B F T INDICATION | DITTO |
| 12: D T M INDICATION | DITTO |
| 13: E D I INDICATION | DITTO |
| 14: B T M INDICATION | DITTO |
| 20: CODING METHOD INDICATION | 00: MH, 01: MR, 02: MMR |
| 21: RECORDING SHEET SIZING INDICATION | 00: A4, 01: B4, 02: A3 |
| ID | 01: FACSIMILE STATE<br>02: REQUEST FOR NOTIFYING HOST COMPUTER STATE<br>10: RECEIVING INDICATION INFORMATION |

FIG. 4(b)

FACSIMILE APPARATUS INCLUDING PROVISIONS FOR DETERMINING FILE TRANSFER CAPABILITY

BACKGROUND OF THE INVENTION

1. Field of the Invention

The present invention relates to a facsimile apparatus and in particular relates to a facsimile apparatus capable of transferring a file according to a standard protocol for G3 mode.

2. Discussion of the Related Art

There have been cases where host computers are connected with each other through a leased line for directly performing file transfer between the host computers. However, if the host computers are connected through the leased line, communication is possible only with extremely limited machines. To solve this problem, a method has been considered in which two host computers are connected to facsimile apparatuses for transferring a file through the facsimile apparatuses.

However, in the case where the file transfer is carried out between the host computers through the facsimile apparatuses, means for announcing and/or indicating capability of the host computers by a standard protocol signal is not provided. For this reason, the file transfer can be performed only between host computers having the same capabilities, though host computers are connected through facsimile apparatuses.

According to a non-standard protocol signal, it is possible to carry out capability announcement or to provide indication, but the deficiency that file transfer can be performed only between the same type of machines employing the non-standard negotiation method still remains.

Japanese Patent Application Unexamined Publication No. Hei. 2-134974 discloses a facsimile apparatus which performs file transfer utilizing a protocol for G4 mode, namely, a protocol for image information transmission. However, it is strongly desired to realize file transfer utilizing a standard protocol for G3 mode which has more generality.

Recently, a recommendation related to G3 facsimile apparatus for document transfer with file transfer function which is able to carry out file transfer utilizing a standard protocol for G3 mode has been issued (ITU-T T.30). Thus, it is expected that the file transfer utilizing the standard protocol for G3 mode will be widespread.

However, there has been a problem in the case where the file transfer is performed between host computers. A conventional facsimile apparatus carries out receiving capability announcement or capability indication by itself for communication, where the capability of a host computer is not considered. If a connected host computer is changed, capability of the new host computer is not reelected in the capability announcement. In the above recommendation, only a criterion of the capability announcement and indication for the facsimile apparatus is shown, but a criterion of the capability announcement and indication for the host computer connected to the facsimile apparatus is not provided because there has been no idea to reflect a state of a host computer in file transfer in a communication protocol.

At the receiving side, not only the host computer, but also a removable data storing device such as an IC card, floppy disk, hard disk, or CD-ROM can be provided as data receiving means. That is, another mode of use can be considered, wherein data is received by the removable data storing device, and after the receiving is completed, the removable data storing device is set to an apparatus capable of analyzing files for data analysis. In this case, the data storing device cannot determine the capability for file transfer; therefore the facsimile apparatus is required to determine the capability of the data storing device.

SUMMARY OF THE INVENTION

The present invention has been made in view of the above circumstances and has as an object of provision a facsimile apparatus which overcomes the above-described problem.

Another object of the present invention is to provide a facsimile apparatus which determines capability of a host computer connected to the facsimile apparatus or the state of a removable storing device and provides announcement or indication in file transfer.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the facsimile apparatus of this invention comprises host computer interface control means for controlling interface with a host computer connected to an external device, host computer capability detecting means for receiving capability information from the host computer through the host computer interface control means, control signal preparing means for generating a protocol control signal based on the capability information detected by the host computer capability detecting means, and communication control means for transferring a file utilizing the protocol control signal generated by the control signal preparing means.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIGS. 4(a) and 4(b) show examples of control information;

DETAILED DESCRIPTION OF THE PREFERRED EMBODIMENTS

Figure 2:
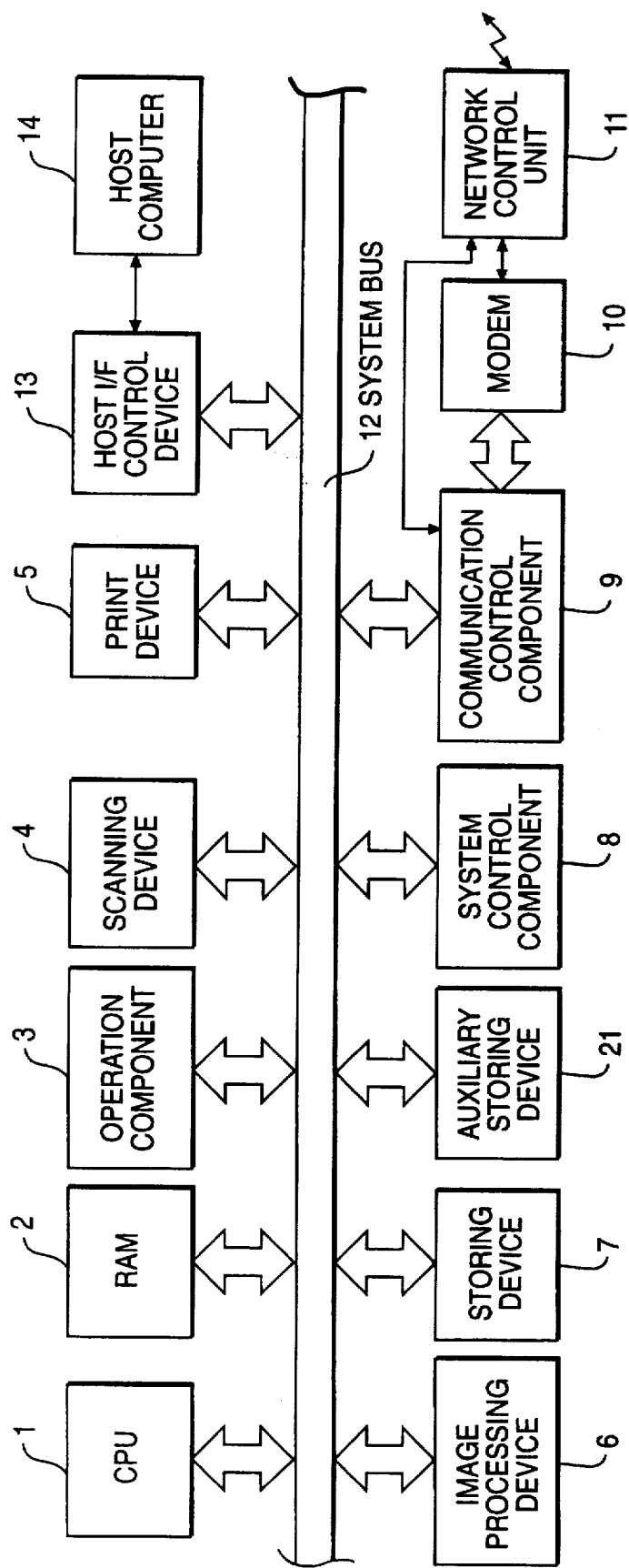
FIG. 2 is a block diagram showing a hardware construction of the embodiment of the facsimile apparatus according to the present invention.

Preferred embodiment of a facsimile apparatus according to the present invention is now described in detail based on the drawings. FIG. 2 is a block diagram showing a hardware construction of an embodiment of the facsimile apparatus. In the figure, an operation component 3 comprises an input device including a keyboard or a mouse with which an operator inputs data and a display device such as an LCD or CRT for processing a result based on the input or indication provided by the input. A scanning device 4 reads out a document to be transmitted, which comprises a CCD element or an optical system. A laser printer or a thermal recording device can be used as a printing device 5 for recording a received image or the like.

A CPU 1 executes a predetermined program for a control process of the whole facsimile apparatus and the process according to a facsimile transfer control protocol. A system control component 8 comprises a program for controlling the whole facsimile apparatus and a ROM which stores system data necessary for executing the program. A RAM 2 is a work area for executing the control program, which stores data to be temporarily stored, for example, control data. A storing device 7 is a large capacity memory for storing image information or files.

An auxiliary storing device 21 such as a hard disk, floppy disk, CD-ROM or IC card is set separately from the storing device 7. The auxiliary storing device 21 is connected to the main body of the facsimile apparatus through a connector so that it is easily removable. An image processing device 6 carries out coding and/or decoding of image information by a coding method, such as one-dimensional coding, two-dimensional coding or T.6 coding (referred to as MH, MR and MMR, respectively).

A communication control component 9 is a ROM storing a control program used for communication control of the facsimile apparatus of a G3 or G4 communication mode, or the like. A modem 10 is a modulation/demodulation device including an interface function which has a low-speed mode (for transmission protocol signal: V.21) and high-speed mode (for image information transmitting/receiving: V.27 ter, V.29, V.33 and V.17). A network control unit 11 has an automatic calling/called function and connects the facsimile apparatus to, for example, an analog or digital network. The above components transmit data or signals to and/or receive data or signals from each other through a system bus 12. A host computer 14 which may be a workstation, personal computer or the like, is connected to the facsimile apparatus through a host I/F control device 13.

With the above hardware construction, the scanning device 4 reads the document to be transmitted in accordance with the indication given by the operator which is input to the operation component 3, and then they are stored in the storing device 7. The storing device 7 stores not only the document to be transmitted which has been read by the scanning device 4, but also files input to the host computer 14 or the operation component 3, or received image information. In accordance with the indication from the operation component 3, the stored image information or the like is sent to the line through the modem 10 and the network control unit 11, and transmitted to a predetermined opposite side facsimile apparatus. Received image information or the like is recorded and output by the printing device 5, or transmitted to the auxiliary storing device 21.

Figure 3:
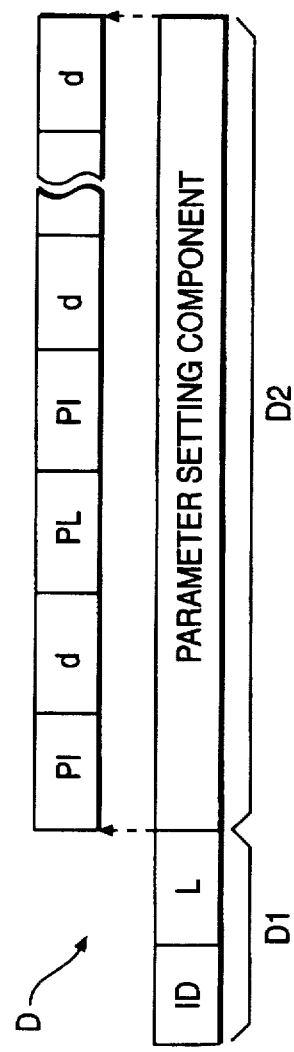
FIG. 3 shows a format of control information used between a host computer and a facsimile apparatus.

The construction of control data used for communication between the facsimile apparatus and the host computer 14 is now described in detail based on FIG. 3. In the figure, control information (D) shows capability or indication regarding the facsimile apparatus and the host computer 14, comprising an identifier setting component D1 specifying a function of the control information (D) and a parameter setting component (D2) specifying a capability or indication related to the facsimile apparatus and the host computer 14. The identifier setting component (D1) further comprises an identifier (ID) and a data length describing component (L) of the parameter setting component (D2). The parameter setting component (D2) comprises a parameter information (PI) component specifying a function corresponding to each parameter, a data component (d) of the parameter information and a data length describing component (PL).

Data examples of the identifier (ID), parameter information (PI) and each parameter are shown in FIGS. 4(a) and 4(b). FIG. 4(a) is an example of control data transmitted from the host computer 14 to the facsimile apparatus, and FIG. 4(b) is an example of control data transmitted from the facsimile apparatus to the host computer 14.

In FIGS. 4(a) and 4(b), BTM is an abbreviation of the basic transfer mode, which is a transfer mode for files of any kind (binary files, wordprocessor native format documents, bitmaps, etc.) without any additional information or file descriptions. A file description is an information regarding file name, data type and the like.

BFT is an abbreviation of the binary file transfer which is a file transfer mode for files of any kinds including the file description and additional information processed at the receiving side. DTM is an abbreviation of the document transfer mode which is a file transfer mode for files of any kind including the file description and additional information readable by the user. EDI is an abbreviation of the EDIFACT file transfer which is a file transfer mode for EDIFACT files coded according to ISO/IEC9735 rules.

Figure 5:
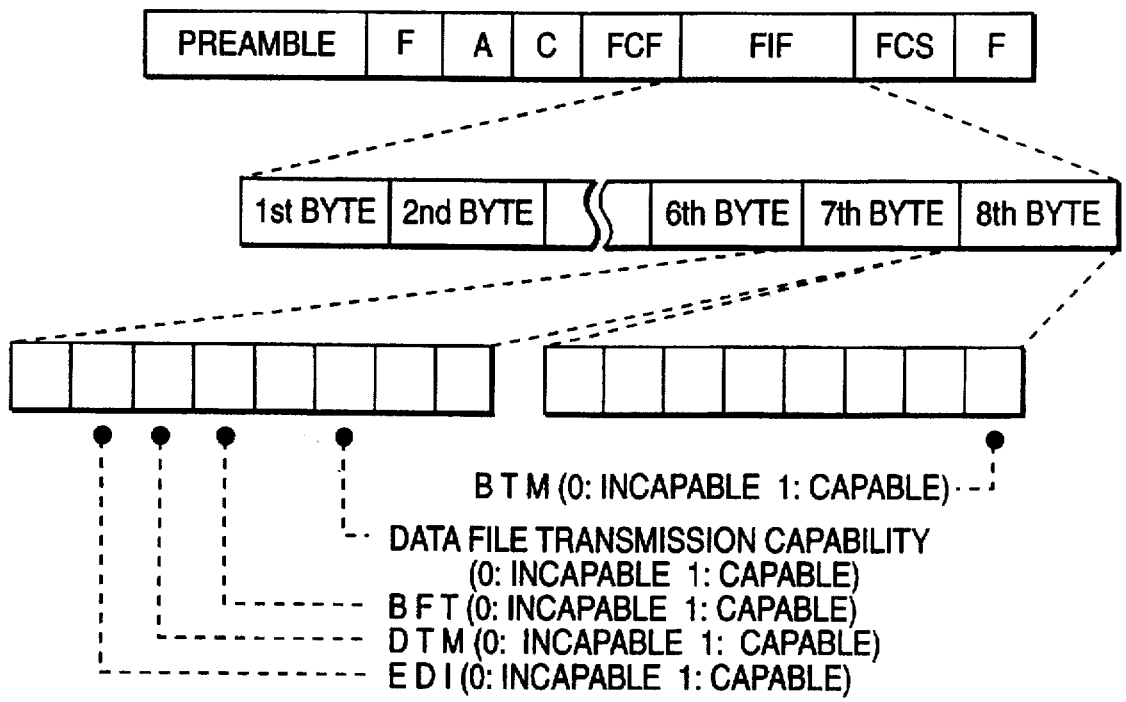
FIG. 5 is a frame construction showing set information of a digital identification signal (referred to as DIS)
Figure 6:
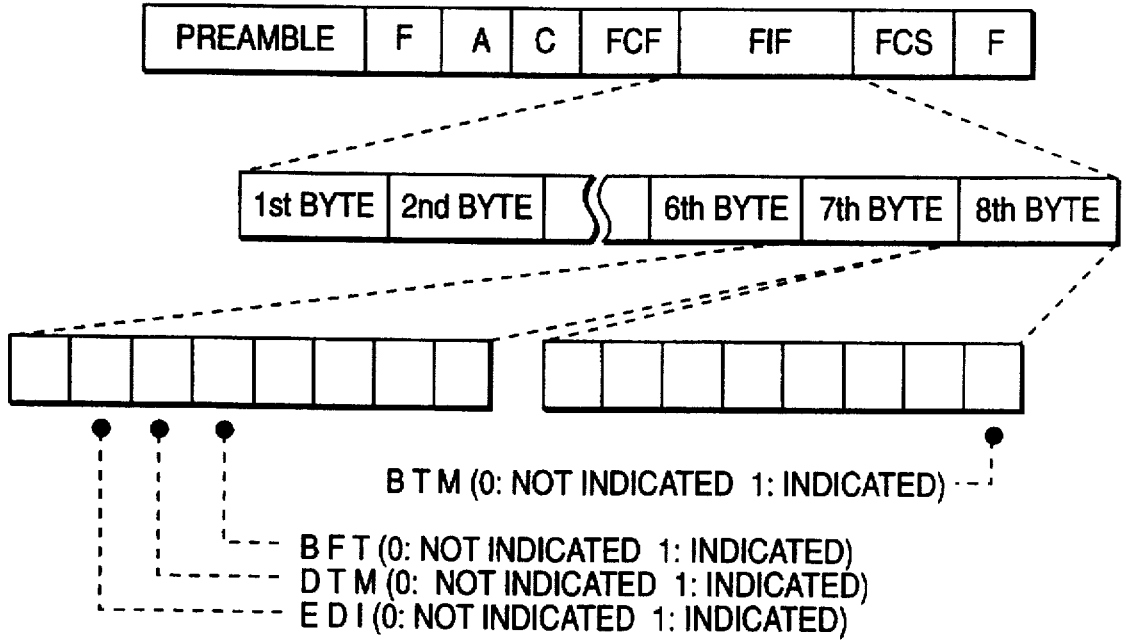
FIG. 6 is a frame construction showing set information of a digital command signal (referred to as DCS)

Next, details of protocol control signals used between facsimile apparatuses for file transfer, namely, the DIS and DCS, are described. FIG. 5 shows an example of the DIS received from the opposite side facsimile apparatus in communication. FIG. 6 is an example of the DCS transmitted to the opposite side facsimile apparatus. Since the frame construction of the DCS is the same as that of the DIS, only indication set in each byte of a facsimile information field (FIF) are shown. Whether there is capability or not is described in the DIS by every data type. In the DCS, indication for the file transfer by every data type, resolution, width and length of a recording sheet for image information transfer, and indication for image information transfer such as a coding method are described. The BTM, BFT, DTM and EDI in FIGS. 5 and 6 have meanings as described above.

Figure 7:
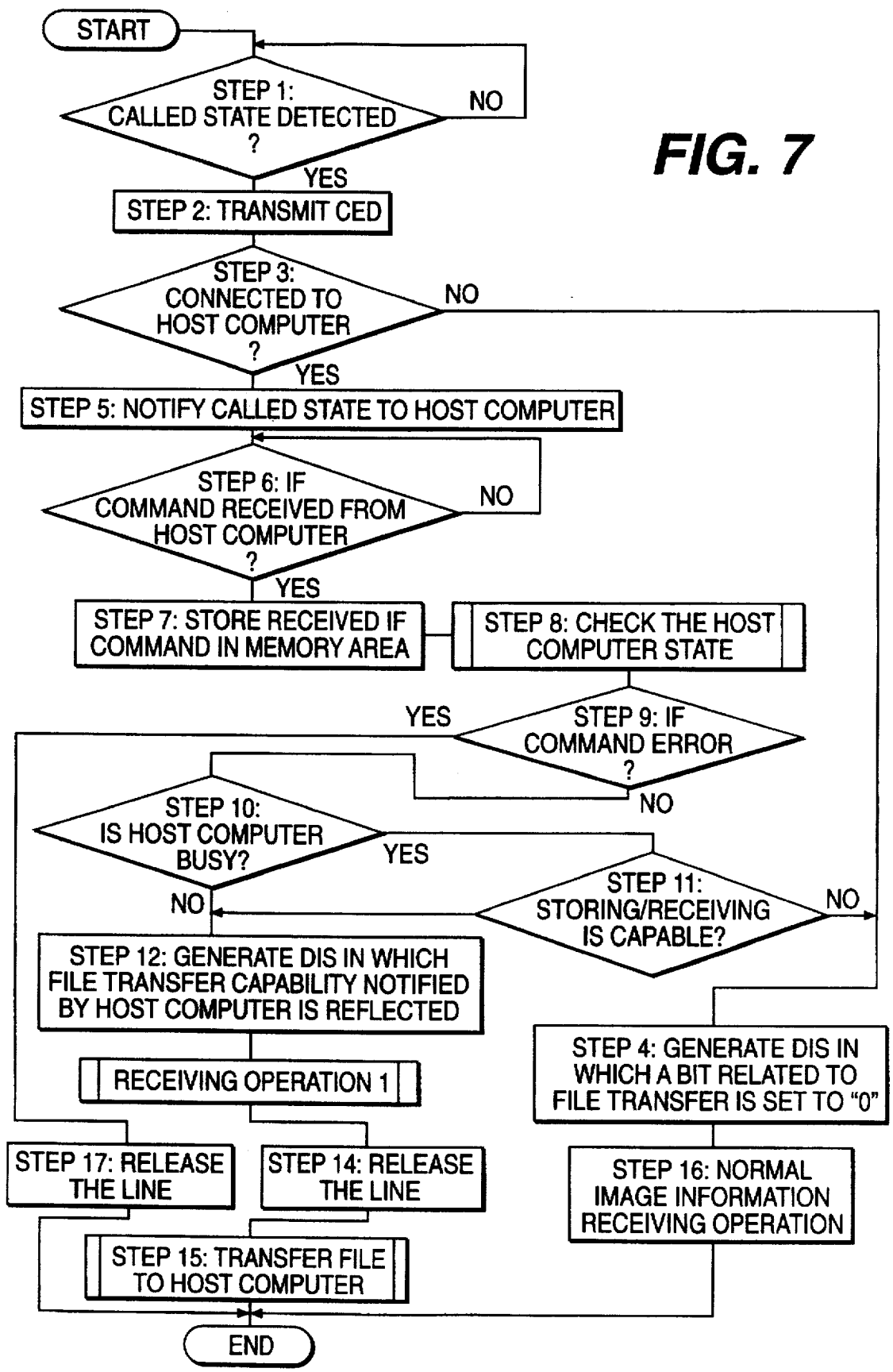
FIG. 7 is a flow chart showing the whole operation of data receiving.

The operations of this embodiment are described based on the flow charts in FIGS. 7–10. In FIG. 7, whether a called state is detected is determined in step 1, and if the called state is detected, a called station identification (referred to as CED) signal is transmitted in step 2. In step 3, it is determined whether the host computer 14 is connected. The determination is made by the host I/F control device 13. If the host computer 14 is not connected, the process proceeds to step 4 to prepare the DIS in which a bit related to file transfer is set to "0". That is, the DIS whose setting shows that no file transfer capability exists is prepared. Then the process proceeds to step 16 and receiving operation for image information according to a normal G3 mode protocol is carried out.

If the host computer 14 is connected, an affirmative determination is provided in step 3, and the process proceeds to step 5. In step 5, in the control information (D) shown in FIG. 3, data "01" which shows the state of the facsimile apparatus is set in the identifier (ID), data "00" is set in the parameter information (PI) and as its content, data "01" showing the called state is set, and then transmitted to the host computer 14.

Receipt of the control information from the host computer 14 transmitted in response to the control information (D), which is called as an IF command, is awaited in step 6. If the IF command is received, the process proceeds to step 7, and the received IF command is stored in a memory area prepared in the RAM 2. The IF command is formed by the host computer 14 based on the example shown in FIG. 4(a).

In step 8, the state of the host computer 14 is checked on the basis of the IF command. In step 9, it is determined whether the identifier (ID) of the IF command is "01", that is, whether the IF command shows the state of the host computer 14, is determined If the identifier (ID) is "01" the process proceeds to step 10; otherwise, the IF command is determined to be an error, and the line is released to finish the process. In this case, an error indication can be made on the display device of the operation component 3.

In step 10, whether the state of the host computer 14 is busy or not is determined on the basis of whether the data component (d) of the parameter information (PI) "00" in the IF command is "01" or not (see FIG. 4(a)). If the state of the host computer 14 is busy, the process proceeds to step 11, where determination as to whether the storing device 7 is capable of receiving/storing the data is made. The determination is made depending upon whether the remaining memory capacity of the storing device 7 is more than a predetermined amount or not. If the remaining memory capacity is larger than the predetermined value, and therefore it is determined that the storing device 7 can perform receiving/storing, the process proceeds to step 12. If the receiving/storing is determined to be impossible, the process proceeds to step 4. In step 12, the DIS reflecting the file transfer capability of the host computer 14, which has been notified by the host computer 14 itself, is generated.

The receiving operation is started in step 13. The details of the receiving operation will be described later related to the flow chart shown in FIG. 8. When receiving is completed, the process proceeds to step 14 and the line is released. In step 15, the received file is transmitted to the host computer 14. The details of the transmission operation to the host computer 14 will be described later related to the flow chart shown in FIG. 9.

Figure 8:
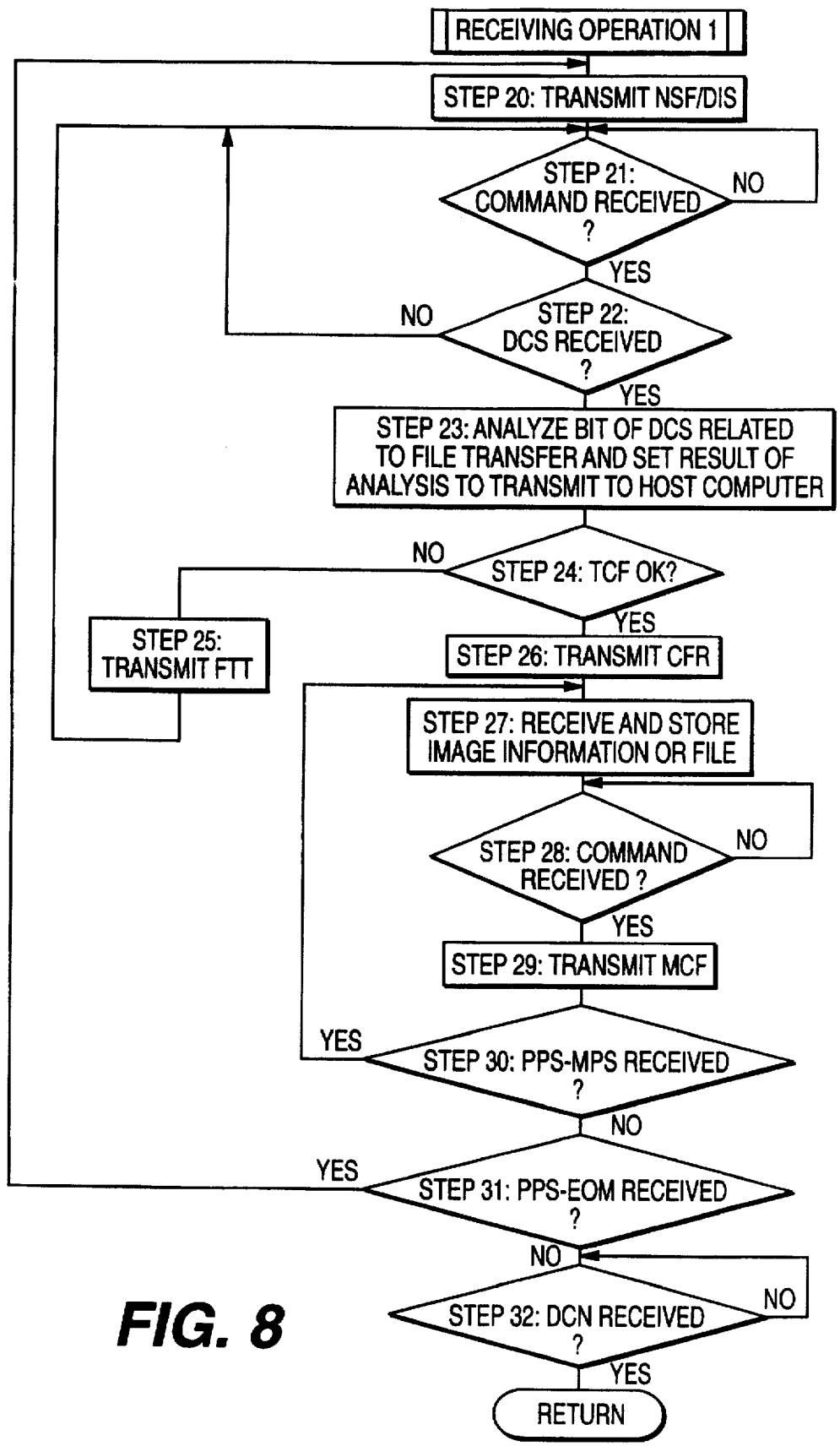
FIG. 8 is a flow chart showing a part of operation of data receiving.

The receiving operation is now described in detail based on the flow chart in FIG. 8. In the figure, a non-standard facilities (referred to as NSF) signal and the DIS which reflects the file transfer capability of the host computer 14 are transmitted in step 20. In step 21, it is determined whether the command is received, and if it is received, the process proceeds to step 22, where determination is made as to whether the received command is the DCS or not. If it is determined that the DCS is received, the process proceeds to step 23. In step 23, the bit of the received DCS related to the file transfer is analyzed, and based on the result of the analysis, indication for the file transfer is set in the data component (d) of the control information (D), and transmitted to the host computer 14.

In step 24, it is determined whether a training check (referred to as TCF) signal is safely received or not. If a negative determination is provided, a failure to train (referred to as FTT) signal is transmitted in step 25, and the process returns to step 21. If the FTT signal is safely received, the process proceeds to step 26, where a confirmation to receive (referred to as CFR) signal is transmitted.

The image information or files are received and stored in the storing device 7 in step 27. In step 28, determination is made as to whether a post-message command is received. If the post-message command is received, the process proceeds to to step 29 and a message confirmation (MCF) signal is transmitted. In step 30, it is determined whether the post message command is a PPS(partial page signal)-MPS(multi-page signal), and if it is determined to be the PPS-MPS, the process proceeds to step 27 to receive the next page. If it is determined not to be the PPS-MPS, the process proceeds to step 31, where determination is made as to whether the post-message command is a PPS-EOM (end of message) signal. If it is determined to be the PPS-EOM signal, the process proceeds to step 20 and operation for receiving a next page is repeated. If it is not the PPS-EOM signal, the process proceeds from step 31 to step 32, where a disconnect (DCN) signal is awaited, and if the DCN signal is received, the receiving operation is finished.

Figure 9:
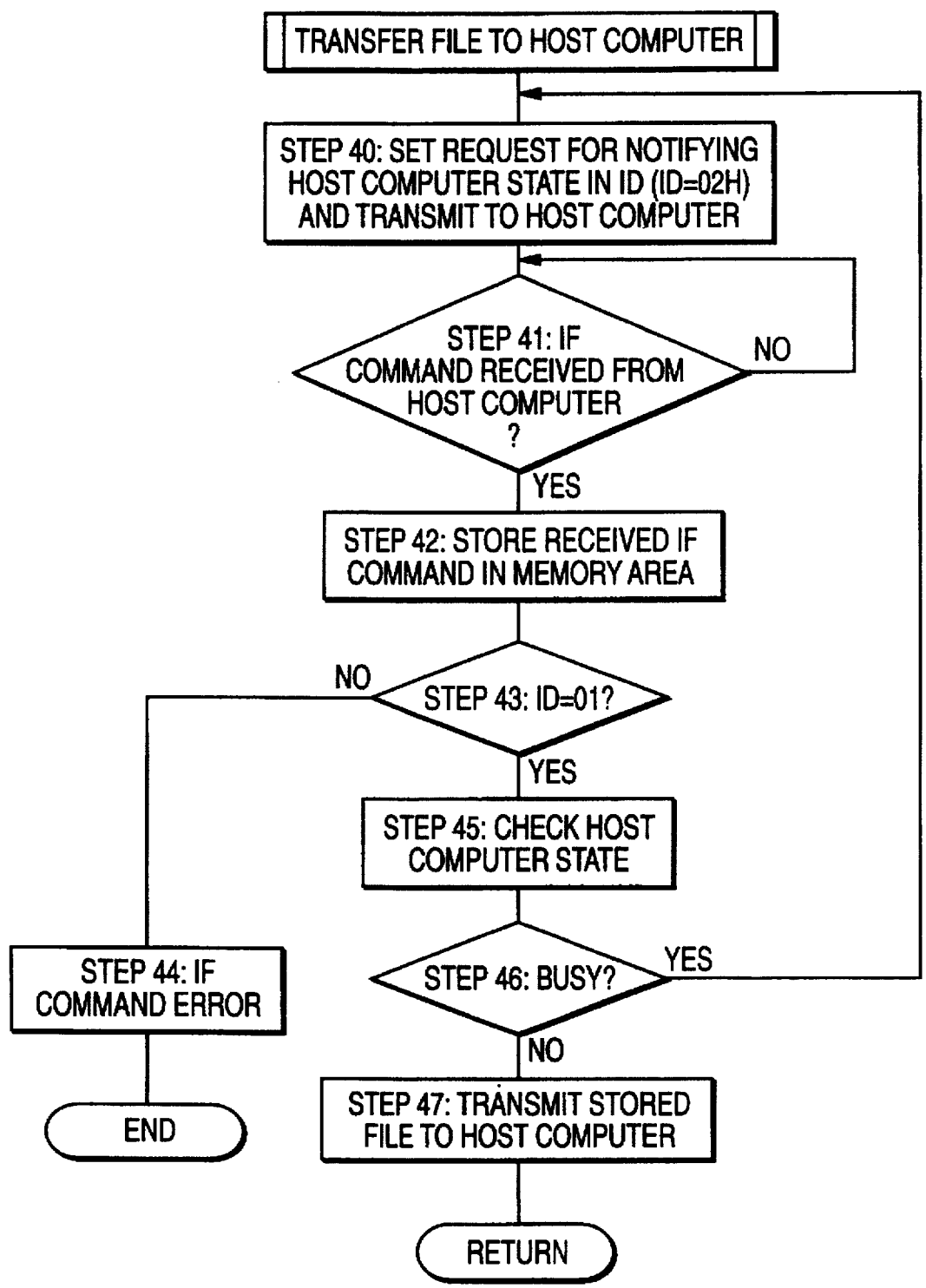
FIG. 9 is a flow chart showing an operation of transferring a file to a host computer.

Next, the operation of transferring a file to the host computer 14 is described in detail based on the flow chart in FIG. 9. In step 40, "02", namely, a request for notifying the state of host computer is set in the identifier (ID) of the control information (D) shown in FIG. 3, and transmitted to the host computer 14. In step 41, receipt of the IF command from the host computer 14 is awaited, and if it is received, the process proceeds to step 42 where the IF command is stored in the memory area of the RAM 2.

Figure 11:
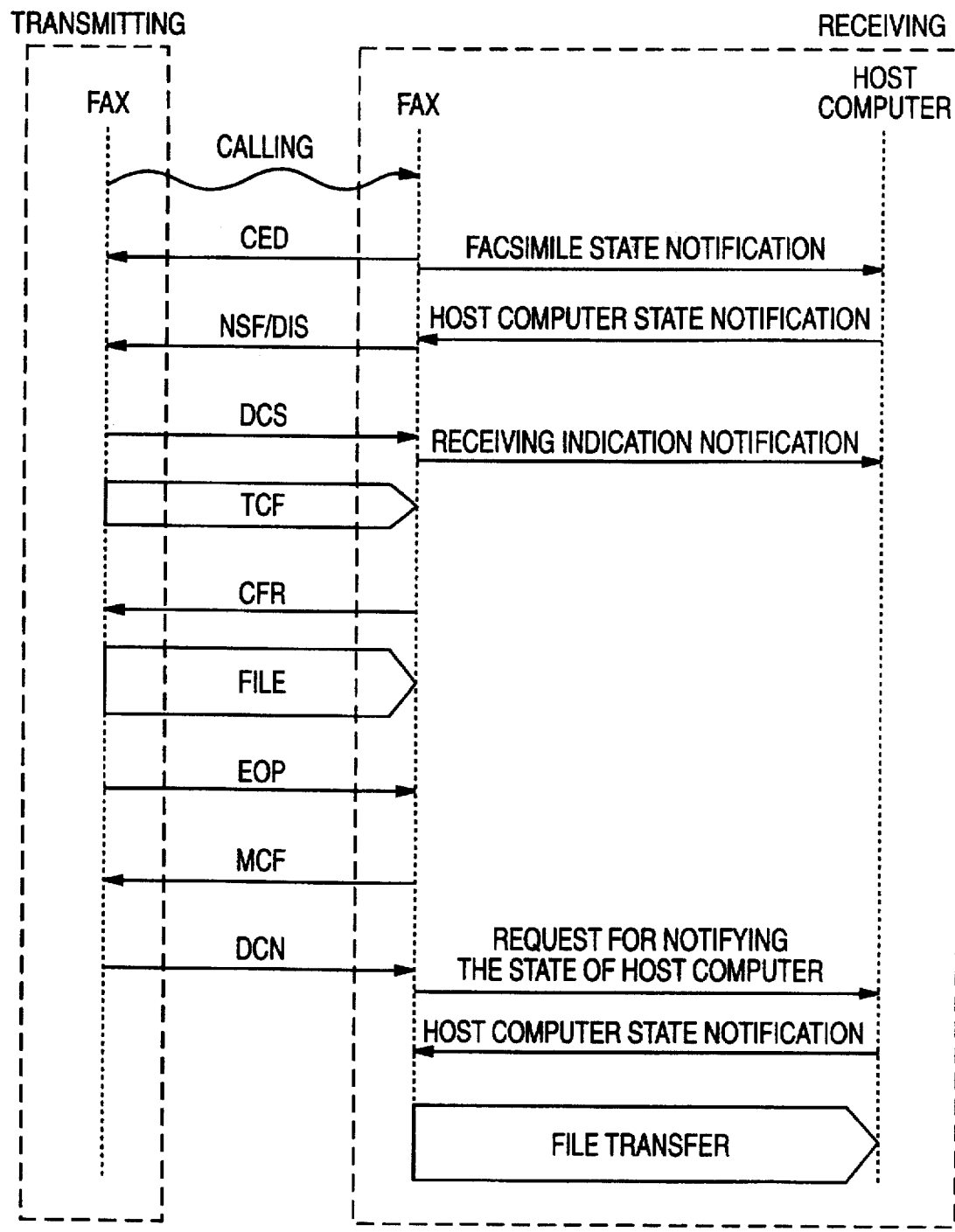
FIG. 11 shows a protocol sequence of the embodiment.

In step 43, a determination is made as to whether an identifier (ID) of the IF command is "01" or not, that is, whether the command shows the state of the host computer. If a negative determination is provided in step 43, "IF command error" is output on the display device of the operation component 3 in step 44, and the process is finished. If the determination provided by step 43 is affirmative, the process proceeds to step 45, where the data component (d) corresponding to the parameter information (PI) "00", namely, data contents corresponding to the parameter information (PI) indicating the state of the host computer is checked. In step 46, whether the value of the data component (d) is "01", that is, whether the state of the host computer 14 is busy, is determined. If it is determined to be busy, the process returns to step 40, and the request for notification of the state of the host computer is made again. If the host computer 14 is not busy, the process proceeds to step 47, where a file stored in the storing device 7 is transmitted to the host computer 14. Sequences of interface control between two facsimile apparatuses and between the facsimile apparatus and the host computer are shown in FIG. 11.

Figure 10:
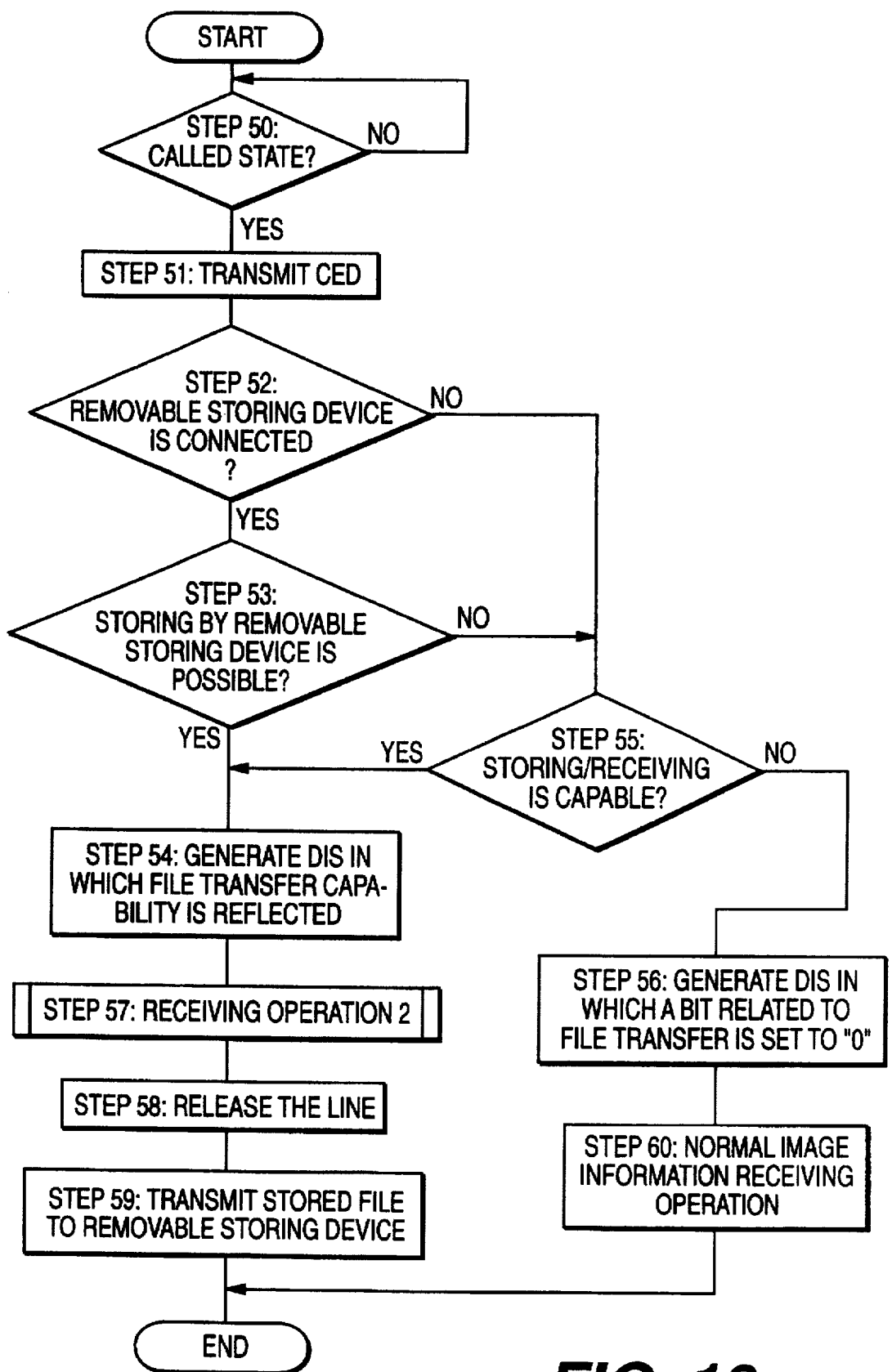
FIG. 10 is a flow chart showing a receiving operation by an auxiliary storing device.

The following description based on the flow chart shown in FIG. 10 is related to the case of receiving a file by the auxiliary storing device connected to the facsimile apparatus, and not by the host computer 14 as described above. As an example, a CD-ROM is used here as the auxiliary storing device.

In step 50, it is determined whether the called state is detected, and if the called state is detected, the process proceeds to step 51 to transmit the CED signal. In step 52, whether a CD-ROM is connected to the facsimile apparatus is determined. The determination is made by checking a port to which the CD-ROM is connected. If it is determined that the CD-ROM is connected, the process proceeds to step 53, and then it is determined whether storing by the CD-ROM is possible. This determination is made based on whether the remaining memory capacity is larger than a predetermined value. If the remaining memory capacity is larger than the predetermined value, the process proceeds to step 54 and the DIS is generated. Here, all bits related to the file transfer capability in the DIS are set to "1", namely, the state that the capability exists, because the file stored in the CD-ROM will be transmitted to another host computer which has file receiving capability to be analyzed.

If a negative determination is provided in step 52 or 53, the process proceeds to step 55, and it is determined whether it is possible to carry out storing/receiving by the storing device 7. This determination is made based on whether the remaining memory capacity is larger than a predetermined value. If the remaining memory capacity is larger than the predetermined value, and therefore determined that storing/receiving is possible, the process proceeds to step 54. However, if it is determined that storing/receiving is impossible, the process proceeds to step 56. In step 56, the DIS in which the bits related to file transfer are set to "0", showing that there is no file transfer capability, is generated. Then the process proceeds to step 60 and the receiving operation for image information is carried out according to the normal G3 mode protocol.

In step 57, the receiving operation is started. The receiving operation is the same as that previously described based on the flow chart in FIG. 8, except the processes of analyzing the DCS from the transmitting side and notifying a result of the analysis to the host computer 14 (step 23); therefore detailed explanation is omitted. If receiving is completed, the process proceeds to step 58 and the line is released. In step 59, the file stored in the storing device 7 is transmitted to the CD-ROM.

The receiving side operation has been taken as an example in the above description, but the present invention can also be practiced at the transmitting side. The procedures are as follows. If an indication for file transfer is provided, a transmitting side facsimile apparatus receives the DIS from the receiving side facsimile apparatus. Then the transmitting side facsimile apparatus obtains capability information from the host computer connected to the transmitting side facsimile apparatus, and sets a file transfer capability in a predetermined bit of the DCS, based on the DIS and capability information. The transmitting side facsimile apparatus provides an indication for the file transfer by the DCS generated as described above, and carries out the file transfer.

Figure 1A:
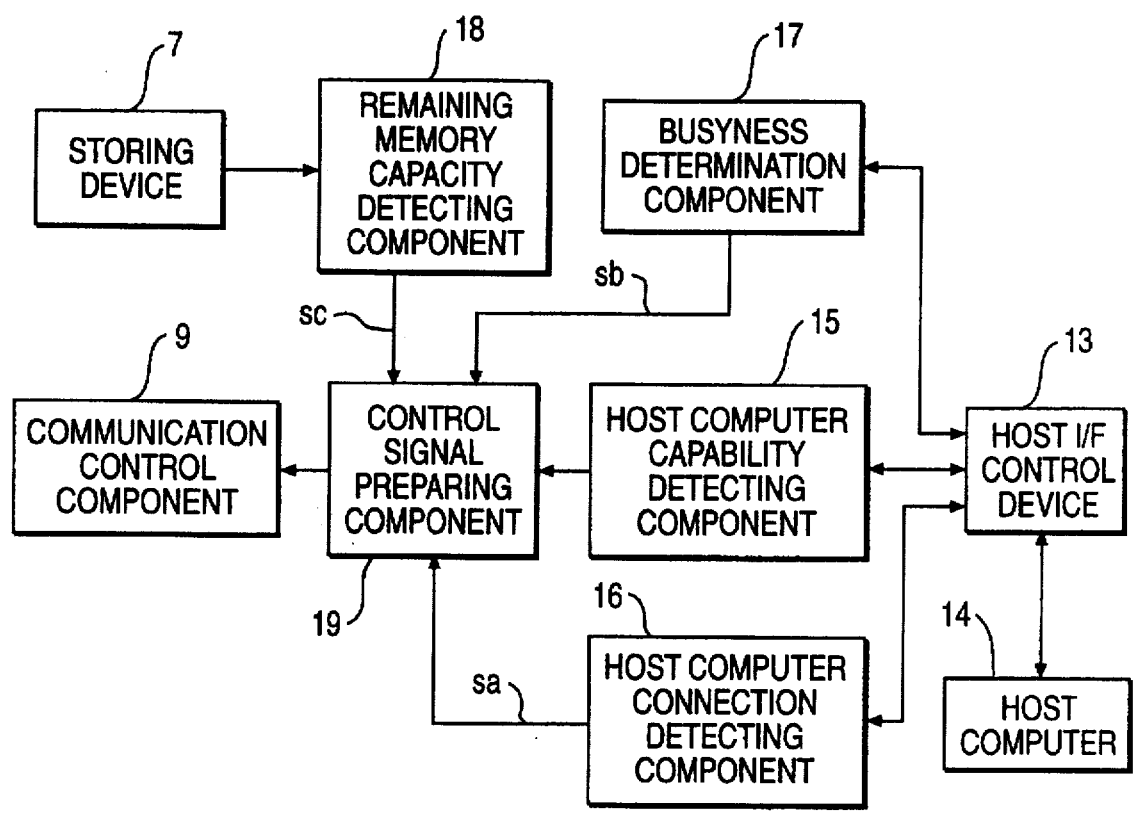
FIGS. 1(a) and 1(b) are block diagrams showing main functions of an embodiment of a facsimile apparatus according to the present invention.
Figure 1B:
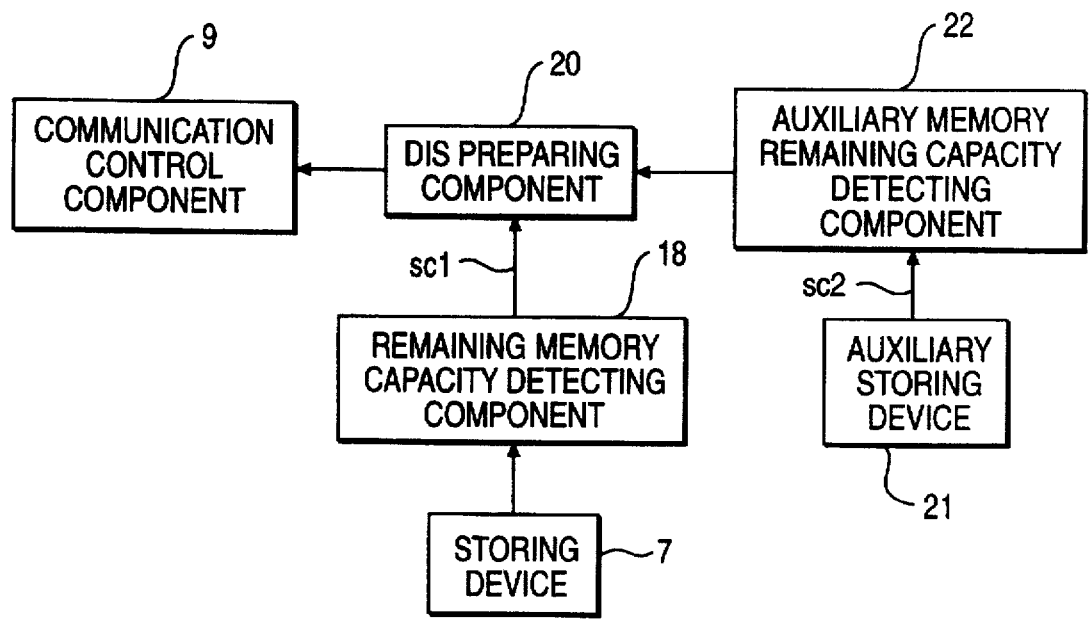

Next, main functions of this embodiment of the facsimile apparatus is described based on the block diagrams in FIGS. 1(a) and 1(b). In FIG. 1(a), the host computer 14 is connected to the host I/F control device 13. A host computer capability detecting component 15 detects the capability of the host computer through the host I/F control device 13. The capability of the host computer includes capability for every type of file transfer. A host computer connection determination component 16 determines whether the host computer 14 is connected, and if it is connected, a connection detecting signal (sa) is transmitted to a control signal preparing component 19. A busyness determination component 17 determines whether the host computer 14 is busy, and if it is determined to be busy, a busyness detecting signal (sb) is transmitted to the control signal preparing component 19. A remaining memory capacity detecting component 18 determines whether the remaining memory capacity of the storing device 7 is larger than a predetermined amount, and if the remaining memory capacity is larger than the predetermined amount, a storing/receiving practicable signal (sc) is transmitted to the control signal preparing component 19.

The control signal preparing component 19 generates a protocol control signal based on the capability information of the host computer 14 provided by the host computer capability detecting component 15. That is, when transmission is performed, the DCS is generated, and in the case of receiving, the DIS is generated. If the connection detecting signal (sa) is supplied, the control signal preparing component 19 generates control information in which a bit indicating no file transfer capability is set to be on. If the storing/receiving practicable signal (sc1) is supplied, the control signal preparing component 19 generates control information in which a capability bit for file transfer is set based on the capability information of the host computer 14 though the busyness detecting signal (sb).

The generated control information is transmitted to the circuit through the communication control component 9. Received image information or files are once stored in the storing device 7, and then transmitted to the host computer 14. If the state of the host computer 14 is busy, the image information or files are transmitted as soon as the state of the host computer 14 becomes not busy.

Next, functions for receiving data by the auxiliary storing device 21 is described. In FIG. 1(b), in the DIS preparing component 20, the protocol control signal, namely, the DIS, is generated according to a predetermined format. An auxiliary memory remaining capacity detecting component 22 checks the remaining memory capacity of the auxiliary storing device 21. If the capacity is larger than a predetermined amount, the storing/receiving practicable signal (sc2) is transmitted to the DIS preparing component 20. The same as described in relation to FIG. 1(a), the storing/receiving practicable signal (sc1) is supplied to the DIS preparing component 20 by the remaining memory capacity detecting component 18. If the storing/receiving practicable signal (sc1 or sc2) is supplied, the DIS preparing component 20 generates the DIS in which all bits related to file transfer are set for receiving the file. The DIS signal is transmitted from the communication component 9 to the line. After the DIS is transmitted, data which has been going through the predetermined procedures and received is stored in the storing device 7, and after receiving is completed, it is transmitted to the auxiliary storing device 21.

In the above description, a case in which data receiving is once completed in the storing device 7, and then the stored data is transmitted to the host computer 14 or auxiliary storing device 21, is taken as an example. However, the data may be transmitted from the storing device 7 to the host computer 14 or the like, while receiving is carried out. The received data is not limited to be transmitted to the host computer 14 or the like, for in the case where the data is image information, it can be output to the printing device 5.

In this embodiment, capability information of the host computer 14 is obtained after the called state is detected. However, it is possible, for example, to periodically obtain the capability information from the host computer 14 and store it no matter whether the called state is detected or not, and generate a control signal according to the stored contents when the called state is detected.

In a similar way, determination of the receiving capability, namely, the remaining memory capacity of the auxiliary storing device 21 may be made based on the result of the regular observation which is carried out independently of detection of the called state.

As clearly described above, according to the present invention, the protocol signal reflecting the capability of the host computer can be generated, and communication with the opposite facsimile apparatus is carried out according thereto, for file transfer.

To be more specific, according to an aspect of the present invention, capability information for every transfer type can be set in the protocol control signal. In another aspect of the present invention, a setting for no capability of file receiving can be made when the host computer is not connected. According to another aspect of the present invention, even though the state of the connected host computer is busy, the file can be received by data storing means if storing/receiving by the data storing means is possible.

Further, other aspects of the present invention make it possible to generate the protocol control signal showing that there is capability of file receiving if receiving by the auxiliary storing device is available, whereby communication utilizing the protocol control signal can be performed for receiving a file. Moreover, if storing by either data storage means or auxiliary storing means is available, file receiving is possible.

The foregoing description of preferred embodiment of the invention has been presented for purposes of illustration and description. It is not intended to be exhaustive or to limit the invention to the precise embodiments disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A facsimile apparatus comprising:

host computer interface control means for controlling an interface with a host computer connected to an external device;

host computer capability detecting means for receiving capability information from said host computer through said host computer interface control means;

control signal preparing means for generating a protocol control signal based on said capability information detected by said host computer capability detecting means; and communication control means for transferring a file utilizing said protocol control signal generated by said control signal preparing means, wherein said capability information indicates whether there is capability for every type of file transfer, and said control signal preparing means sets a predetermined value in a bit of said protocol control signal corresponding to each type of file transfer based on said capability information.

2. A facsimile apparatus comprising:

host computer interface control means for controlling an interface with a host computer connected to an external device;

host computer capability detecting means for receiving capability information from said host computer through said host computer interface control means;

control signal preparing means for generating a protocol control signal based on said capability information detected by said host computer capability detecting means;

communication control means for transferring a file utilizing said protocol control signal generated by said control signal preparing means; and host computer connection determining means for determining whether said host computer is connected to said facsimile apparatus utilizing said host computer interface control means, wherein said control signal preparing means sets a value indicating that there is no file transfer capability in a predetermined bit of said protocol control signal if said host computer connection determining means determines that said host computer is not connected to said facsimile apparatus.

3. The facsimile apparatus according to claim 1, further comprising:

host computer connection determining means for determining whether said host computer is connected to said facsimile apparatus utilizing said host computer interface control means, wherein said control signal preparing means sets a value indicating that there is no file transfer capability in a predetermined bit of said protocol control signal if said host computer connection determining means determines that said host computer is not connected to said facsimile apparatus.

4. A facsimile apparatus comprising:

host computer interface control means for controlling an interface with a host computer connected to an external device;

host computer capability detecting means for receiving capability information from said host computer through said host: computer interface control means;

control signal preparing means for generating a protocol control signal based on said capability information detected by said host computer capability detecting means;

communication control means for transferring a file utilizing said protocol control signal generated by said control signal preparing means;

host computer state determining means for determining whether the state of said host computer is busy utilizing said host computer interface control means;

data storing means for storing received data; and storing practicability determining means for determining whether said data storing means has a predetermined remaining memory capacity or more, wherein said control signal preparing means includes means for preparing a protocol control signal based on said capability information if the state of said host computer is determined to be busy by said host computer state determining means, and said data storing means has said predetermined remaining memory capacity or more.

5. The facsimile apparatus according to claim 1, further comprising:

host computer state determining means for determining whether the state of said host computer is busy utilizing said host computer interface control means;

data storing means for storing received data; and storing practicability determining means for determining whether said data storing means has a predetermined remaining memory capacity or more, wherein said control signal preparing means includes means for preparing a protocol control signal based on said capability information if the state of said host computer is determined to be busy by said host computer state determining means, and said data storing means has said predetermined remaining memory capacity or more.

6. The facsimile apparatus according to claim 2, further comprising:

host computer state determining means for determining whether the state of said host computer is busy utilizing said host computer interface control means;

data storing means for storing received data; and storing practicability determining means for determining whether said data storing means has a predetermined remaining memory capacity or more, wherein said control signal preparing means includes means for preparing a protocol control signal based on said capability information if the state of said host computer is determined to be busy by said host computer state determining means and said data storing means has said predetermined remaining memory capacity or more.

7. The facsimile apparatus according to claim 3, further comprising:

host computer state determining means for determining whether the state of said host computer is busy utilizing said host computer interface control means;

data storing means for storing received data; and storing practicability determining means for determining whether said data storing means has a predetermined remaining memory capacity or more, wherein said control signal preparing means includes means for preparing a protocol control signal based on said capability information if the state of said host computer is determined to be busy by said host computer state determining means and said data storing means has said predetermined remaining memory capacity or more.

8. A facsimile apparatus comprising:

removable auxiliary storing means;

state determining means for determining whether said auxiliary storing means is present;

protocol control signal preparing means for setting a predetermined value in a bit of a protocol control signal related to a file transfer, if said state determining means determines that said auxiliary storing means is present; and communication control means for receiving a file transfer utilizing said protocol control signal generated by said protocol control signal preparing means.

9. The facsimile apparatus according to claim 8, further comprising:

data storing means for storing received data; and storing practicability determining means for determining whether said data storing means has a predetermined remaining memory capacity or more, wherein said protocol control signal preparing means sets file receiving capability in said protocol control signal if said state determining means determines that said auxiliary storing means is not present, and said storing practicability determining means determines that said data storing means has the predetermined remaining memory capacity or more.

* * * * *